(12) United States Patent
Malpartida et al.

(10) Patent No.: US 12,147,930 B2
(45) Date of Patent: Nov. 19, 2024

(54) AUTOMATED LOCAL DELIVERY CENTER

(71) Applicant: PepsiCo, Inc., Purchase, NY (US)

(72) Inventors: Gino Malpartida, Norwalk, CT (US); Michael Sasloff, Hastings-on-Hudson, NY (US); Eleonor Dorin Stoenescu, Stamford, CT (US)

(73) Assignee: PepsiCo, Inc., Purchase, NY (US)

( * ) Notice: Subject to any disclaimer, the term of this patent is extended or adjusted under 35 U.S.C. 154(b) by 138 days.

(21) Appl. No.: 17/690,705

(22) Filed: Mar. 9, 2022

(65) Prior Publication Data

US 2023/0289706 A1 Sep. 14, 2023

(51) Int. Cl.
*G06Q 10/0832* (2023.01)
*B67D 99/00* (2010.01)

(52) U.S. Cl.
CPC ......... *G06Q 10/0832* (2013.01); *B67D 99/00* (2013.01)

(58) Field of Classification Search
CPC .................... G06Q 10/0832; B67D 99/00
See application file for complete search history.

(56) References Cited

U.S. PATENT DOCUMENTS

| | | | | |
|---|---|---|---|---|
| 11,069,082 B1* | 7/2021 | Ebrahimi Afrouzi | .. | H04N 23/56 |
| 11,272,806 B1* | 3/2022 | Studor | ................ | A47J 31/525 |
| 11,400,596 B2* | 8/2022 | Liivik | ................ | B25J 19/0054 |
| 2007/0127691 A1* | 6/2007 | Lert | .................. | G06Q 99/00 |
| | | | | 379/265.05 |
| 2010/0317377 A1* | 12/2010 | Zou | ................ | G06Q 10/02 |
| | | | | 455/466 |
| 2011/0307547 A1* | 12/2011 | Backer | ............. | G06Q 10/1095 |
| | | | | 709/203 |
| 2013/0087050 A1* | 4/2013 | Studor | ................. | A47J 31/525 |
| | | | | 99/279 |
| 2014/0120235 A1* | 5/2014 | Jones | ................ | G07F 17/0064 |
| | | | | 901/30 |
| 2015/0120094 A1* | 4/2015 | Kimchi | ................ | G01C 21/20 |
| | | | | 701/3 |
| 2016/0033966 A1* | 2/2016 | Farris | .................... | G06Q 10/08 |
| | | | | 701/16 |
| 2017/0011442 A1* | 1/2017 | Hu | ............................ | G07G 1/00 |

(Continued)

FOREIGN PATENT DOCUMENTS

| | | | | | |
|---|---|---|---|---|---|
| CN | 101958020 A | * | 1/2011 | ............... | B65G 1/04 |
| CN | 101977694 A | * | 2/2011 | ........... | B05B 12/122 |

(Continued)

OTHER PUBLICATIONS

Andre Navarro, "a mobile robot vending machine for beaches based on consumers preferences and multivariate methods", published by Elsevier, in 2014, all pages (Year: 2014).*

(Continued)

*Primary Examiner* — Omar Zeroual
(74) *Attorney, Agent, or Firm* — Sterne, Kessler, Goldstein & Fox P.L.L.C.

(57) ABSTRACT

A system for automated vending and delivery of products to consumers is provided. The system may include a mobile delivery unit, a product dispenser, and a web server. The system may also include a pickup area. The web server may instruct the product dispenser to dispense a product to the mobile delivery unity. The web server may also provide instructions to the mobile delivery unit, which may then navigate to the consumer for delivery.

18 Claims, 14 Drawing Sheets

(56) References Cited

U.S. PATENT DOCUMENTS

| | | | | |
|---|---|---|---|---|
| 2018/0158018 | A1* | 6/2018 | Luckay | G06Q 10/0832 |
| 2018/0315271 | A1* | 11/2018 | Gharabegian | F03G 6/001 |
| 2019/0291069 | A1* | 9/2019 | McIntosh | B01F 33/84 |
| 2019/0333036 | A1* | 10/2019 | Bryant | G06Q 30/0643 |
| 2019/0369641 | A1* | 12/2019 | Gillett | B62D 57/028 |
| 2021/0188617 | A1* | 6/2021 | Tarter | B67D 1/1227 |
| 2022/0026920 | A1* | 1/2022 | Ebrahimi Afrouzi | G06N 7/01 |
| 2022/0027882 | A1* | 1/2022 | Kennon | G07F 11/16 |
| 2023/0316848 | A1* | 10/2023 | Westphal | B25J 9/1679 |
| | | | | 700/231 |

FOREIGN PATENT DOCUMENTS

| | | | | |
|---|---|---|---|---|
| CN | 106133781 A | * | 11/2016 | B25J 11/001 |
| CN | 206011103 U | * | 3/2017 | |
| CN | 107195091 A | * | 9/2017 | |
| CN | 206975758 U | * | 2/2018 | |
| CN | 207489154 U | * | 6/2018 | |
| CN | 207799795 U | * | 8/2018 | |
| CN | 108972586 A | * | 12/2018 | |
| CN | 109147179 A | * | 1/2019 | G06Q 10/083 |
| CN | 109637016 A | * | 4/2019 | G07F 11/002 |
| CN | 208988543 U | * | 6/2019 | A47J 31/401 |
| CN | 209842764 U | * | 12/2019 | |
| CN | 110969392 A | * | 4/2020 | |
| CN | 110969762 A | * | 4/2020 | |
| CN | 211427432 U | * | 9/2020 | |
| CN | 211440049 U | * | 9/2020 | |
| CN | 211979764 U | * | 11/2020 | |
| CN | 212379918 U | * | 1/2021 | |
| CN | 113299005 A | * | 8/2021 | G07F 11/00 |
| CN | 113331693 A | * | 9/2021 | |
| CN | 215149138 U | * | 12/2021 | B25J 11/00 |
| CN | 215450296 U | * | 1/2022 | |
| CN | 215622144 U | * | 1/2022 | |
| CN | 217821726 U | * | 11/2022 | |
| CN | 115761987 A | * | 3/2023 | |
| GB | 2593144 A | * | 9/2021 | G06Q 10/08 |
| WO | WO-2015120384 A1 | * | 8/2015 | B25J 11/001 |
| WO | WO-2023084296 A1 | * | 5/2023 | |

OTHER PUBLICATIONS

Andre Navarro, "a mobile robot vending machine for beaches based on consumers preferences and multivariate methods", published by Elsevier, in 2014 (Year: 2014).*

* cited by examiner

AUTOMATED LOCAL DELIVERY CENTER

FIELD

Embodiments described herein relate to product dispensing systems and methods. Specifically, embodiments relate to automated localized delivery of products, such as beverages or packaged foods, from product dispensers to delivery areas or consumers.

BACKGROUND

Various devices may be used to dispense a product to a consumer. Consumers may purchase products from vending machines, dispense beverages from fountain beverage dispensers, or may retrieve products from product storage cabinets or coolers. In each of these various methods of selecting a product, a consumer is required to travel to the product dispensers, which may be located remote from the consumer. Additionally, the consumer may need to traverse stairs or navigate through different building areas to reach a particular product dispenser, which requires time, ability, and energy. Once proximate to the product dispenser, the consumer may be required to wait for a period of time to retrieve a product. Further, the consumer may have to contact the product dispenser to retrieve the product. Another concern is that the consumer may desire a particular product that the product dispenser proximate to the consumer may not contain. The consumer may not have knowledge of this unavailability before traveling to the product dispenser. Consumers may prefer to avoid one or more of these issues to retrieve a product for consumption.

SUMMARY OF THE INVENTION

Embodiments provide a system for automated vending and delivery of products to consumers. The system may include a mobile delivery unit, a product dispenser, and a web server. The product dispenser may, in a first transaction, dispense a first product to the mobile delivery unit for a subsequent delivery to a first consumer remote from the product dispenser and, in a second transaction, dispense a second product to a second consumer at the product dispenser. The web server may be in communication with the product dispenser and the mobile delivery unit. The web server may also instruct the product dispenser to dispense the first product to the mobile delivery unit in the first transaction.

In some embodiments, the web server may also determine a priority of dispensing between the mobile delivery unit and the second consumer. In some embodiments, the priority may be based on at least one of a product order time, a product availability, and an arrival time by the mobile delivery unit and the second consumer to the product dispenser. In some embodiments, the web server may receive an order for the first product from an electronic device of the first consumer. In some embodiments, the mobile delivery unit may include a sensor to navigate to the product dispenser. In some embodiments, the mobile delivery unit may deliver the first product to a pickup area. The pickup area may be determined based on at least one of a selection by the first consumer, the proximity to the first consumer, and a temperature control capability. In some embodiments, the product dispenser may include a communication assembly configured to communicate with at least one of the web server and the mobile delivery unit. In some embodiments, the mobile delivery unit may include a communication assembly configured to communicate with at least one of the web server and the product dispenser. In some embodiments, the product dispenser may be a beverage dispenser.

Embodiments provide a method of automated vending and delivery of a product to consumers. The method may include displaying a list of products available in a predetermined area on an electronic device; receiving a selection of a product from the list of products on the electronic device; instructing a mobile delivery unit to retrieve the product; and instructing the mobile delivery unit to deliver the product to the consumer.

In some embodiments, the method may also include loading the product into a receptacle of the mobile delivery unit. In some embodiments, instructing the mobile delivery unit to deliver the product to the consumer may include delivering the product to a pickup area. In some embodiments, the method may also include selecting a delivery criteria; and confirming the delivery criteria is satisfied. The delivery criteria may include at least one of a delivery location and a selected recipient. In some embodiments, the method may also include selecting a second product from the list of products; and receiving the second product from the mobile delivery unit. In some embodiments, the second product may be located separately from the first product.

Embodiments provide a method of automated vending and delivery. The method may include displaying a list of products available on a mobile electronic device of a consumer; receiving a product selection and an identity of the consumer from the mobile electronic device; instructing a product dispenser to dispense a selected product; loading the selected product to the mobile delivery unit for delivery to the consumer; and delivering the selected product to the consumer.

In some embodiments, the method may also include receiving a payment from the mobile electronic device of the consumer. In some embodiments, delivering the selected product to the consumer may include determining the selected product requires temperature control; identifying a pickup area based on a temperature control capability; and delivering the selected product to the pickup area. In some embodiments, delivering the selected product to the consumer may include navigating to the consumer based on at least one of a navigational instruction from a web server and a map stored in a memory of the mobile delivery unit. In some embodiments, the method may also include detecting a gripper of a mobile delivery unit in the product dispensing area and grasping the selected product via the gripper.

BRIEF DESCRIPTION OF THE FIGURES/DRAWINGS

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION

Figure 1:
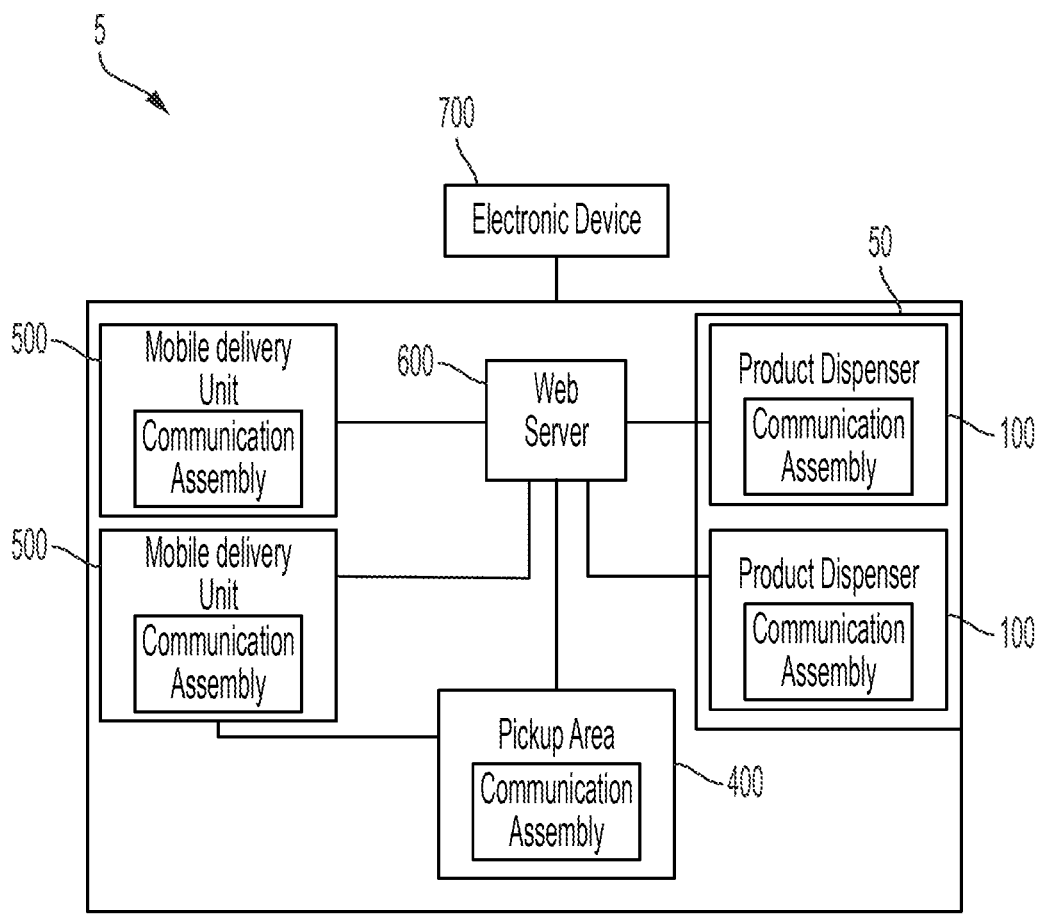
FIG. 1 shows a schematic diagram of components in a predetermined area for delivering a according to an embodiment.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as may be included within the spirit and scope of the described embodiments as defined by the claims.

As used herein, the term "contactless" may refer to the ability to select, retrieve, pay for, and initiate dispensing of a product without the consumer physically contacting a system, such as by touching a keypad, touch screen, door or handle with the consumer's hands or fingers. However, it is understood that the consumer may touch the product itself to retrieve the product. Further, it is understood that in some embodiments as noted herein, a consumer may choose to perform one or more of selecting, retrieving, paying for, and initiating dispensing of a product by physically contacting or touching the system if desired.

As used herein, the term "product" may refer to any of various food and beverage items, and particularly packaged food and beverages, such as bags or sleeves of chips, cookies, crackers, and the like, granola bars, power bars, energy bars, and packaged beverages, such as bottled beverages, canned beverages, beverages in pouches, including carbonated beverages, such as sparkling water, soda, and energy drinks, water, milk or dairy-based beverages, coffee or tea-based beverages, among others.

Consumers may desire beverage or food products at their workplace or other locations where they spend extended periods of time (e.g., school, conventions, resorts, etc.). Products may be available via a variety of devices. Retrieving a product may require selection. Additionally, some devices and/or locations may require purchase. To retrieve products from these devices, the consumer generally must be in the immediate vicinity of the device. However, locating and traveling to a device may be time consuming, difficult, and inefficient. Additionally, the device may not have a product that the consumer desires. To select and purchase a product, the consumer may also have to physically contact the device, which may carry germs from other consumers. Consumers may choose not to use such a device if they do not feel that the device is close enough, contains their desired product, or is clean and sanitary. These and other issues are described further below.

Consumers may obtain desired products from areas such as kitchens and common areas. These areas may support product dispensers including vending machines, fountain beverage dispensers, and coolers, among others. Product dispensers may provide a variety of beverages or packaged foods, which may in turn have storage and delivery characteristics related to temperature or expiration date, for example.

The consumer may need to be proximate to the area or product dispenser to retrieve a product for consumption. Thus, retrieving products requires the consumer to know which areas and/or product dispensers are available in a predetermined area. However, in large buildings or campuses (e.g., for work or school), the consumer may not know where products located. Additionally or alternatively, the consumer may not know where the closest area and/or product dispenser having products is located. Accordingly, the consumer may spend undue time and effort to locate an area and/or product dispenser and this area and/or product dispenser may not be the closest location to retrieve products for consumption. Further, large areas, such as offices, may have many floors or multiple buildings. Moving between floors and building may require traversing stairs or outdoor terrain, which may be difficult for those who have mobility concerns.

Once proximate to an area and/or product dispenser, the consumer may need to wait in a line to access the available products. This may increase the total time the consumer spends to retrieve their desired product. In addition, the consumer may realize that their desired product is not available at the particular area and/or product dispenser. The consumer may become frustrated as they spent time and energy traveling to the product dispenser. They may attempt to locate another area and/or product dispenser to find their desired product, which may compound the inefficiency of retrieving products in a predetermined area.

If a desired product is located, the consumer may be required to physically touch the product dispenser to operate a dispensing button or to make beverage selections on a touch screen or the like. Some product dispensers may require payment, which also requires the consumer to physically touch the product dispenser. As a result, the product dispenser may accumulate germs from various consumers contacting the product dispenser. For example, vending machines may allow a consumer to select a product and dispense the selected product in an unattended manner. In order to operate the vending machine, the consumer must generally operate a keypad or touch screen to make product selections, confirm selections. The consumer may also have to contact the vending machine to enter payment, such as when swiping a credit card or inserting paper currency.

In addition, product accessories, such as cups, straws, and sugar, may be available to all consumers who use the product dispenser. Consumers may be concerned that the straws and cups are not sanitary, for example, due to the ability for any consumer to handle the straws and cups. Similarly, storage cabinets and coolers in areas such as kitchens may store products for retrieval in storage compartments accessible by physically touching the storage compartments. For example, some storage compartments may require opening a door to retrieve a product. In order to access the products, the consumer may have to grasp the door and manually open the door. Further, as consumers access products in these storage compartments, consumers may touch and handle products they do not select and retrieve such that each remaining stored product may also carry germs.

To obtain a desired product without having to locate and travel to an area and/or product dispenser containing the desired product, consumers may request a person to conduct these tasks for them and deliver the product. However, the delivery person may also find it difficult to locate or travel to an area or machine having the desired product in the same ways as the consumer. In addition, the consumer may have to coordinate with the person to obtain their delivery. For example, the consumer may need to inform the person of their location and any updates to their location. They may also need to help the delivery person navigate to them, which may cause frustration as the consumer may desire to avoid navigating altogether. Further, having delivery people retrieve and deliver products may cause germs to spread to the area and/or product dispenser, the desired product, other stored products, and any product accessories.

Semi-automated solutions may also require consumer interaction. For example, the consumer may have knowledge of the specific area and/or product dispenser having their desired product. Systems may allow them to order or reserve their desired product from the pinpointed area and/or product dispenser. But the consumer still might need to travel to the specific area and/or product dispenser to retrieve their desired product. In campus settings in which many buildings are situated, each building may have many floors. The required travel to and from an area and/or product dispenser may be time-consuming and frustrating.

In another example, a mobile delivery unit may be equipped to retrieve and deliver a desired product. However, utilizing a mobile delivery unit may require numerous user inputs, e.g., ordering, confirmations, and location updates. Such systems may also be frustrating.

Therefore, a need exists to provide consumers with systems and methods for automated local delivery that minimizes user interaction. In other words, automated localized delivery of products from product dispensers is desired to provide products to consumers without requiring consumers to leave their location and interact directly with such devices.

As described herein, systems and methods are provided for automated local delivery that minimizes user interaction. The systems and methods utilize product areas and dispensers, mobile delivery units that retrieve and deliver product orders, a mobile application for ordering and payment, and a web server for receiving ordering information, instructing mobile delivery unit 300 on product retrieval and delivery, and receiving confirmation of delivery.

Embodiments will now be described with reference to the figures. With reference to FIG. 1, a product area 50 may contain one or more products for retrieval. As shown, product area 50 may include one or more product dispensers 100 containing products, such as beverages, snacks, and/or packaged foods. A mobile delivery unit 300 may retrieve a product from product area 50 and deliver the product to a consumer or a pickup area 400. A web server 600 may facilitate interaction between product dispensers 100, mobile delivery unit 300, and/or pickup area 400 by communicating with product dispensers 100, mobile delivery unit 300, and/or pickup area 400. Additionally or alternatively, product dispensers 100, mobile delivery unit 300, and/or pickup area 400 may communicate directly with one another.

Web server 600 may provide instructions to and receive confirmations from product dispensers 100, mobile delivery unit 300, and/or pickup area 400. In some embodiments, product dispensers 100 may each include a communication assembly 130 to communicate with web server 600. In some embodiments, web server 600 may also communicate with one or more mobile delivery units 300, each mobile delivery unit 300 having a communication assembly 530 to communicate with web server 600. In some embodiments, product dispenser 100 and mobile delivery unit 300 may communicate directly with each other via communication assembly 130 and mobile delivery unit 300. In some embodiments, mobile delivery unit 300 may communicate directly with pickup area 400 via communication assembly 530 and a communication assembly 430 of pickup area 400. In some embodiments, mobile delivery unit 300 may communicate with pickup area 400 via web server 600.

The systems and methods described herein may be implemented in a predetermined area 5. A consumer may be located in predetermined area 5, which may contain product areas 50, product dispensers 100, mobile delivery units 300, and pickup areas 400. Predetermined area 5 may be an office, a building, such as an office building or a school, or a larger area, such as an office campus, a school campus, or a resort area, among others.

While in predetermined area 5, a consumer may desire a product, such as a beverage or a snack. The consumer may travel to a product area 50 and/or a product dispenser 100 to retrieve a product. Alternatively, or in combination, the consumer may utilize an electronic device 700 to order a product for delivery. In some embodiments, electronic device 700 may be a user device such as a smartphone, a tablet, a computer, etc. In some embodiments, electronic device 700 may be a common device utilized by many consumers. In some embodiments, electronic devices 800 may be positioned throughout predetermined area 5 to receive orders from consumers for delivery. A consumer may utilize electronic device 700 to select a desired product and input their delivery location. In some embodiments, the delivery location may be where the consumer will be located during delivery. In some embodiments, the delivery location may be a pickup area 400. In some embodiments, the consumer must also provide payment for the product via electronic device 700 for delivery. Once a product is selected, and paid for, if needed, a mobile delivery unit 300 may be deployed to retrieve the desired product and complete the delivery. In some embodiments, electronic device 700 may communicate with web server 600 such that web server 600 may coordinate product and retrieval and delivery. In some embodiments, electronic device 700 is a handheld device.

In some embodiments, product area 50 may be a general area having products for consumption, such as a kitchen, break room, lounge, or other common area. In some embodiments, product area 50 may be a temporary place for holding products, such as a conference room or a space having meetings or events with consumables available, e.g., for socials, town halls, bake sales, etc. In some embodiments, product area 50 may be a cafeteria or food court having multiple beverage or food stations. In some embodiments, product area 50 may be a location where shareable consumables are available, e.g., homemade goods, Halloween candy, Girl Scout™ cookies, etc.

In some embodiments, product dispensers 100 may be vending machines, fountain beverage dispensers, or coolers. In some embodiments, product dispensers 100 are post-mix beverage dispensers. Product dispensers 100 may include a variety of products that have various characteristics, related to temperature or expiration date, for example.

Figure 2:
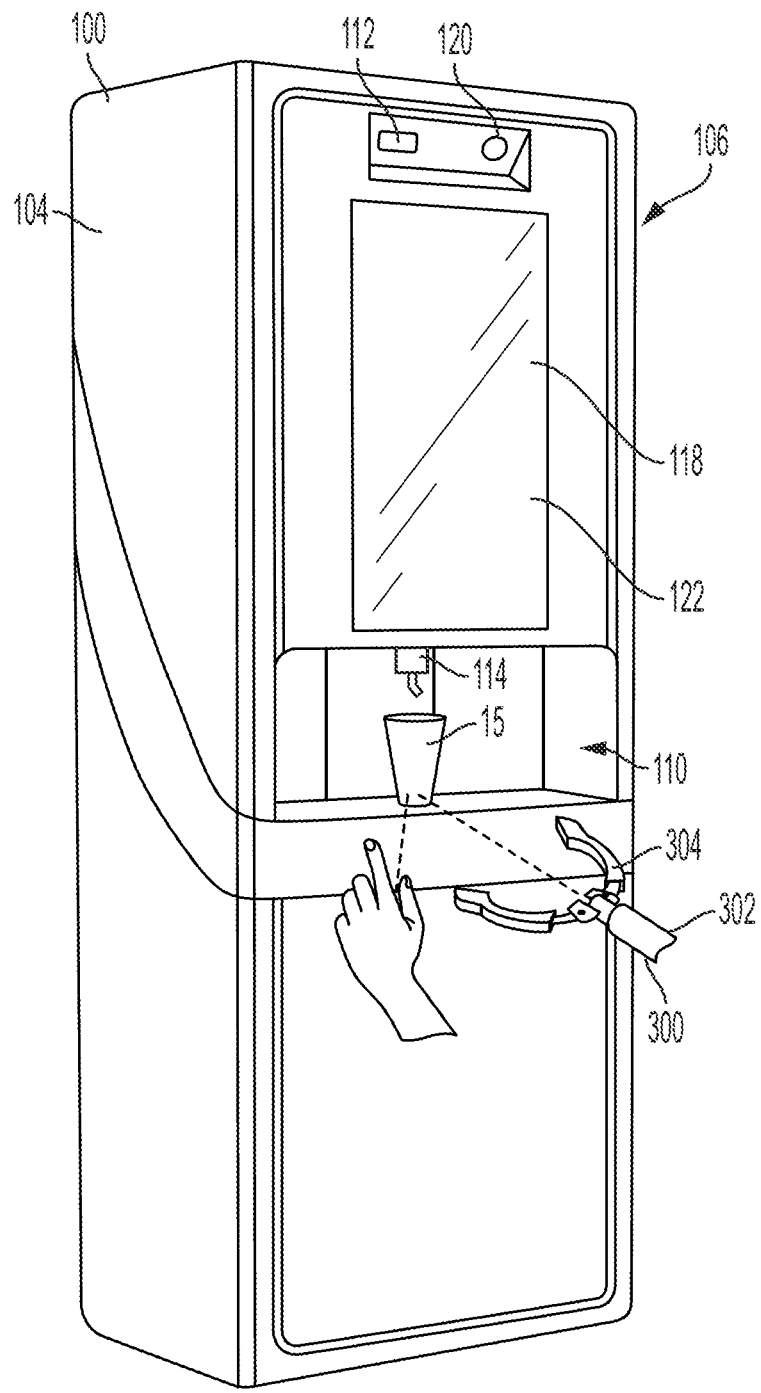
FIG. 2 shows a perspective view of a product dispenser according to an embodiment.

In some embodiments, product dispenser 100 may be a fountain beverage dispenser, as shown in FIG. 2. In some embodiments, product dispenser 100 may include a housing 102, a first side 104, a second side 106, a delivery area 110, a sensor 112, a dispensing nozzle 114, a digital display 118, a sensor 120, and a user interface 122.

In some embodiments, a consumer may desire a product, where the product is a fountain beverage. As shown, a consumer may approach product dispenser 100 with a container 15 and position container 15 within delivery area 110. In some embodiments, product sensor 120 may indicate when container 15 is located in delivery area 110. In some embodiments, the consumer may obtain information related to product availability via digital display 118. For example, the consumer may be able to view available products and instructions for using product dispenser 100. In some embodiments, user interface 122 may be a touch screen aspect of digital display 118. User interface 122 may facilitate selection of a product to be dispensed. In some embodiments, the consumer may select a product for dispensing such that product dispenser 100 dispenses the selected product into container 15 via dispensing nozzle 114. The consumer may then retrieve the product in container 15 from delivery area 110.

In some embodiments, mobile delivery unit 300 includes an arm 302. In some embodiments, a gripper 304 is attached to arm 302 such that the mobile delivery unit 300 is configured to autonomously pick up, place, handle, and otherwise manipulate a product, for example. In some embodiments, mobile delivery unit 300 may have a suction cup. In some embodiments, mobile delivery unit 300 may approach product dispenser 100 in the same way as the consumer. Additionally, mobile delivery unit 300 may access delivery area 110 in the same way as the consumer. As shown, the consumer's hand may be extended to grasp container 15. Similarly, arm 302 of mobile delivery unit 300 may be extended to grasp container 15. In some embodiments, arm 302 may be adjustable to reach delivery areas 112 at different heights. In some embodiments, gripper 304 of arm 302 may grasp container 15 to retrieve container 15 from delivery area 110. In some embodiments, product dispenser 100 may load product 10 directly onto mobile delivery unit 300.

In some embodiments, one or more consumers and one or more mobile delivery units 300 may be proximate to product dispenser 100 to retrieve a product from product dispenser 100. Product dispenser 100 may dispense beverages into container 15 for a consumer or a mobile delivery unit 300. In this way, consumers may utilize product dispenser 100 as usual, while the additional capability of servicing mobile delivery units 300 is added to product dispenser 100. Consumers then have a choice whether to travel to product dispenser 100 independently or to leverage a mobile delivery unit 300 to retrieve a desired product.

In some embodiments, product dispenser 100 does not require modification to service mobile delivery units 300. In some embodiments, product dispenser 100 may be positioned in a product area 50 to facilitate servicing mobile delivery units 300. For example, each product dispenser 100 in a product area 50 may be spaced farther from another product dispenser 100 to allow both consumers and mobile delivery units 300 additional room to approach a product dispenser 100. In some embodiments, electronic components (e.g., sensor 120, sensor 112, communication assembly 130) and/or other components may be retrofit onto product dispenser 100 to facilitate servicing mobile delivery units 300.

In some embodiments, sensor 120 may detect when the consumer is proximate to product dispenser 100 such that the consumer may access delivery area 110, digital display 118, and/or user interface 122. In some embodiments, sensor 120 may detect when mobile delivery unit 300 is proximate to product dispenser 100 such that mobile delivery unit 300 may access delivery area 110. Sensor 120 may be a proximity sensor that faces toward the consumer and/or mobile delivery unit 300. In some embodiments sensor 120 may comprise a camera.

Sensor 120 may detect a presence of a consumer, such as by detecting the consumer's hand. Similarly, sensor 120 may detect a presence of mobile delivery unit 300, such as by detecting a presence of arm 302 and/or gripper 304. In some embodiments, sensor 120 may not activate unless sensor 120 detects the presence of the consumer or mobile delivery unit 300 within a predetermined detection distance of sensor 120. In some embodiments, sensor 120 may not activate unless sensor 120 detects the presence of the consumer and/or mobile delivery unit 300 for a predetermined detection time, for example, three seconds. Thus, the consumer and/or mobile delivery unit 300 may be positioned within the detection distance of sensor 120 for a predetermined detection time in order to activate sensor 120. This may help to prevent accidental activation of sensor 120 if a consumer and/or mobile delivery unit 300 briefly pass by sensor 120.

It should be understood that the consumer may use other body parts, such as an elbow or foot, or the consumer may use an object, such as a purse or bag, among other objects, to be detected by sensor 120 so long as the object is located within the predetermined detection distance of sensor 120. Similarly, various parts of mobile delivery unit 300 may activate sensor 120, such as arm 302 or gripper 304. Mobile delivery unit 300 will be described further below.

In some embodiments, sensor 112 indicates that a product and/or container 15 are positioned in delivery area 110. In some embodiments, sensor 112 is actuated by a proximity sensor detecting product and/or container 15 in delivery area 110. In some embodiments, sensor 112 may not activate unless product and/or container 15 in delivery area 110 for a predetermined detection time, for example, three seconds. This may help to prevent accidental activation of sensor 112 if an object briefly passes through delivery area 110.

With reference to FIGS. 1-2, electronic device 700 communicates to web server 600 a selected product for delivery to the consumer or a pickup area 400. In some embodiments, web server 600 instructs mobile delivery unit 300 to navigate to product dispenser 100 containing the product. Product dispenser 100 may sense that mobile delivery unit 300 is proximate to product dispenser 100 via sensor 120. Product dispenser 100 may then communicate a confirmation signal of the presence of mobile delivery unit 300 to web server 600. In some embodiments, product dispenser 100 may sense the proximity of one or more consumers and one or more mobile delivery units 300 and communicate to web server 600 a confirmation signal that one or more consumers and one or more mobile delivery units 300 are proximate to product dispenser 100. In some embodiments, web server 600 may then provide instructions to product dispenser 100 to prioritize dispensing of a product for retrieval by the one or more consumers and one or more mobile delivery units 300. In some embodiments, the priority may be based on priority parameters. The priority of dispensing based on priority parameters will be discussed further below.

In some embodiments, product dispenser 100 may sense that a product and/or container 15 are positioned in delivery area 110 via sensor 112. Product dispenser 100 may then communicate a confirmation signal of the presence of a product and/or container 15 to web server 600. In some embodiments, web server 600 may then communicate instructions to mobile delivery unit 300 to grasp and retrieve container 15. In some embodiments, web server 600 may delay communication of instructions to mobile delivery unit 300 to grasp and retrieve container 15 to ensure that container 15 is filled before retrieval. In some embodiments, the delay may be ten seconds after sensor 112 indicates that a product and/or container 15 are positioned in delivery area 110. In some embodiments, mobile delivery unit 300 may communicate a confirmation signal to web server 600 upon receipt of the instructions. In some embodiments, mobile delivery unit 300 may communicate a confirmation signal to web server 600 once container 15 is grasped and/or retrieved. Additionally or alternatively, product dispenser 100 may communicate a confirmation signal to web server 600 once container 15 is grasped and/or retrieved. In some embodiments, product dispenser 100 may communicate directly to mobile delivery unit 300 to grasp and retrieve container 15.

Figure 3:
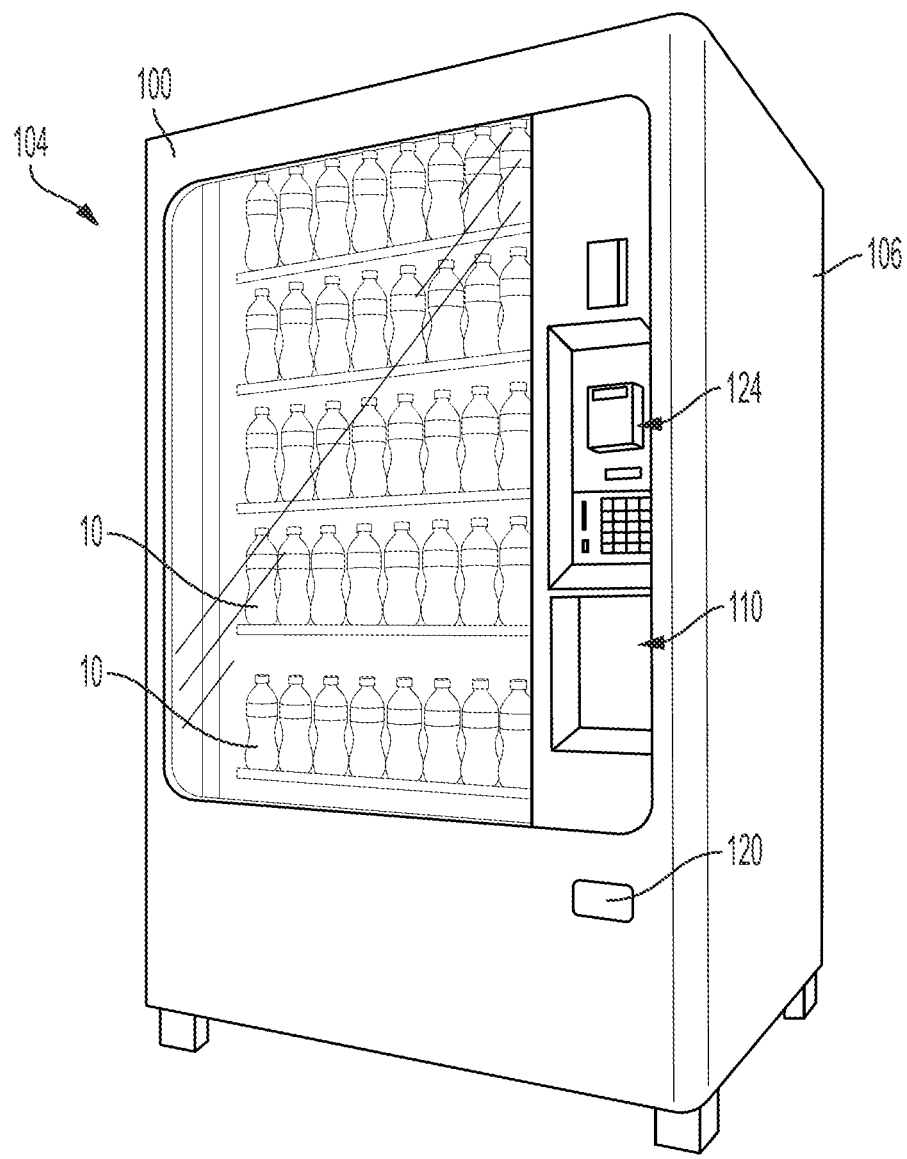
FIG. 3 shows a perspective view of a product dispenser according to an embodiment.

As shown in FIG. 3, in some embodiments, product dispenser 100 may be a vending machine. Product dispenser 100 as a vending machine may be operable in the same way as product dispenser 100 that is a fountain beverage dispenser, which is described above with reference to FIG. 2. Product dispenser 100 may house one or more products 10, which may be beverages and/or packaged foods. In such embodiments, products 10 may be detected, grasped, and retrieved from product dispenser 100 shown in FIG. 3 as discussed above with reference to container 15 (FIG. 2).

In some embodiments, product dispenser 100 may include a payment processing unit 124. In some embodiments, payment may be required to retrieve product 10. Consumers may provide payment via payment processing unit 124. In some embodiments, payment processing unit 124 may receive payments in a contactless manner. Payment processing unit 124 may include a reader, such as a camera, for reading a quick response (QR) code or other readable code presented by a consumer, wherein the QR code corresponds to a payment source, such as a mobile payment. Payment processing unit 124 may include a near field communication (NFC) antenna configured to communicate with a contactless payment card for touch-and-go payments. In some embodiments, payment processing unit 124 may additionally include a money slot for receiving paper or coin currency or tokens, or a payment card reader for reading a payment card, such as a credit card, debit card, gift card, or the like by swiping the card or inserting the card into the reader, or both.

In some embodiments, payment processing unit 124 may include a keypad to provide payment. Accordingly, a consumer may leverage mobile delivery unit 300 (FIG. 1) to retrieve a product without having to contact payment processing unit 124. In this way, the consumer may avoid germs that may spread to payment processing unit 124 from direct use by other consumers. Similarly, mobile delivery unit 300 may be leveraged to avoid physically touching user interface 122 of digital display 118 discussed above with reference to FIG. 2.

Selection and payment may additionally or alternatively be procured on electronic device 700 (FIG. 1). The consumer may have access to a mobile application on electronic device 700 that allows them to see what products 10 are available. The consumer may select and pay for a desired product 10 via the mobile application. In some embodiments, payment is not necessary, such as in office environments that provide products 10 to employees. In some embodiments, rather than selecting a specific product, the consumer may simply select a product criteria, such as a cool beverage, a hot beverage, or a carbonated beverage. Ordering may be triggered by an order confirmation once selection and/or payment are completed.

Web server 600 (FIG. 1) may control the system and manage the mobile application. Web server 600 may provide instructions to product dispensers 100, mobile delivery unit 300, and/or pickup area 400 based on the consumer's inputs. Web server 600 may confirm selection of product 10, payment, and delivery by providing instructions and receiving confirmations. In some embodiments, web server 600 receives a confirmation signal from electronic device 700 (FIG. 1) indicating the consumer's order. In some embodiments, web server 600 may find a product in predetermined area 5 (FIG. 1) that matches the selected product criteria. In some embodiments, web server 600 may provide instructions to a mobile delivery unit 300 to retrieve and deliver the order to the consumer. Thus, ordering may be one of the few user inputs required by the systems and methods described herein. Accordingly, minimal user interaction is required to receive a product 10.

Figure 4:
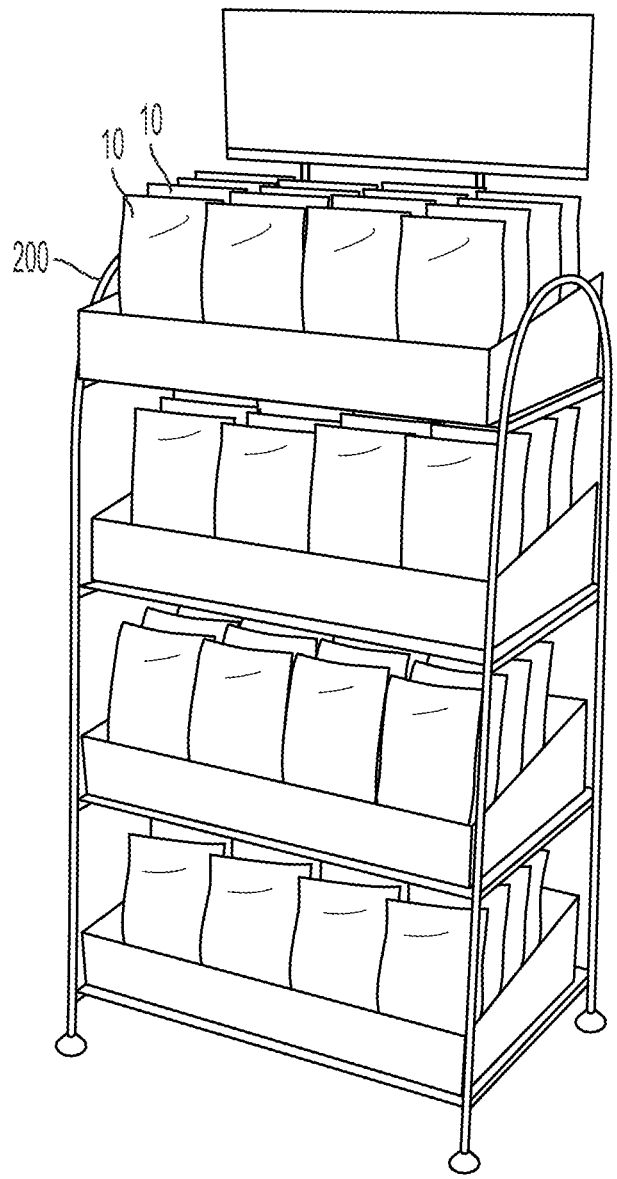
FIG. 4 shows a perspective view of a rack according to an embodiment.

A rack 200 may also include products 10 for retrieval and delivery, as shown in FIG. 4. Racks 200 may be located in product areas 50. Products 10 on rack 200 may be packaged foods. In such embodiments, products 10 may be detected, grasped, and retrieved from rack 200 as discussed above with reference to container 15 (FIG. 2).

Figure 5:
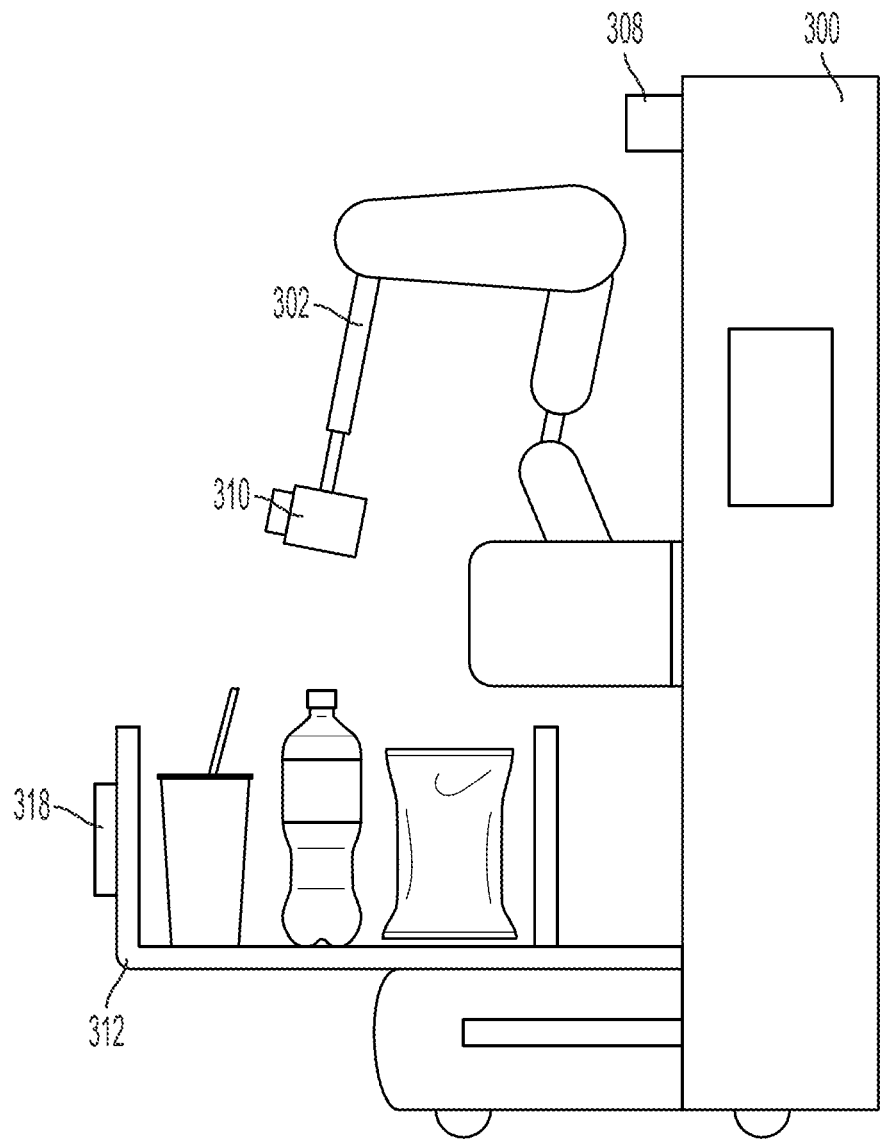
FIG. 5 shows a side view of a mobile delivery unit according to an embodiment.

Mobile delivery unit 300 will be described in more detail. With reference to FIG. 5, mobile delivery unit 300 may include a sensor 308 and a sensor 310. In some embodiments, sensor 308 may be a proximity sensor and sensor 310 may be a computer vision/optical sensor. Sensor 308 and sensor 310 may facilitate locating, retrieving, and delivering products 10. In this way, mobile delivery unit 300 may navigate to and sense when it is proximate to product dispenser 100 (FIGS. 1-3). Other combinations of sensors may be used. Additionally, mobile delivery unit 300 may use sensor 310 to identify and retrieve products 10 from storage equipment in product areas 50 (FIG. 1). In addition, mobile delivery unit 300 may utilize location data and navigation to retrieve and deliver products 10.

In some embodiments, mobile delivery unit 300 may store in a memory preinstalled maps of predetermined area 5 (FIG. 1). Mobile delivery unit 300 may use the maps to determine where a product area 50 is located in predetermined area 5 (FIG. 1). Mobile delivery unit 300 may download maps or complete a mapping exercise to learn a predetermined area 5. In some embodiments, to facilitate navigation mobile delivery unit 300 may utilize communication assembly 330 to communicate with elevators, doors, security, etc. In some embodiments, mobile delivery unit utilizes sensor 308 and/or sensor 310 to identify elevators, doors, and/or security. This allows mobile delivery unit 300 to navigate through predetermined area 5 to fulfill orders.

In some embodiments, mobile delivery unit 300 may utilize sensor 308 and/or sensor 310 to sense consumers. In this way, mobile delivery unit 300 and consumers may both navigate through predetermined area 5 (FIG. 1), such as to product areas 50, simultaneously. In some embodiments, mobile delivery unit 300 may wait in and advance through a line for an ordered product 10 or navigate through crowds at a product area 50.

In some embodiments, mobile delivery unit 300 may be controlled by web server 600 (FIG. 1) that provides instructions and receives confirmations from mobile delivery unit

300. Web server 600 (FIG. 1) may providing instructions to mobile delivery unit 300 step by step, or all at once. For example, web server 600 may instruct a mobile delivery unit 300 to go to a particular product area 50 to fulfill an order. Web server 600 may provide mobile delivery unit 300 with instructions on how to navigate to a product area 50. Once mobile delivery unit 300 provides confirmation that it is at the product area 50, web server 600 may provide instructions to mobile delivery unit 300 to retrieve an ordered product 10. As discussed above, in some embodiments, a confirmation signal may be communicated to web server 600 once a product 10 is grasped and/or retrieved. Once mobile delivery unit 300 provides confirmation that it has retrieved the product, web server 600 may provide instructions on delivery. In some embodiments, after receiving this confirmation signal, web server 600 may provide mobile delivery unit 300 with instructions to navigate to a consumer or pickup area 400 (FIG. 1) to deliver product 10. In some embodiments, mobile delivery unit 300 may communicate a confirmation signal upon receipt of these instructions. In some embodiments, after receiving this confirmation signal, web server 600 may provide navigation instructions to mobile delivery unit 300 indicating how to travel to the consumer or pickup area 400 (FIG. 1) for delivery. In some embodiments, web server 600 may provide navigation information to mobile delivery unit 300 directly after an order is placed. Web server 600 may also provide more than one instruction at once and may receive bundled confirmations.

In some embodiments, web server 600 (FIG. 1) provides navigation instructions based on mobile delivery unit 300. For example, mobile delivery unit 300 may include wheels and/or legs. The wheels have mobile delivery unit 300 may be larger for traversing outdoor terrain. Legs of mobile delivery unit 300 may facilitate traversing stairs. In some configurations, mobile delivery unit 300 maybe particularly agile. If mobile delivery unit 300 is agile, web server 600 may provide a route that traverses stairs and/or outdoor terrain. However, if mobile delivery unit 300 is incapable of such operation, web server 600 may direct mobile delivery unit 300 through a simpler route that may be exclusively indoors and/or on one floor of a building, for example. In some embodiments, navigation instructions may be a function of time. For example, a consumer may specify a time at which they desire a product 10. Accordingly, web server 600 may instruct mobile delivery unit 300 to retrieve a product 10 from a less crowded product area 50 (FIG. 1). Additionally, web server 600 may instruct mobile delivery unit 300 to retrieve a product 10 from a closer product area 50. In this way, mobile delivery unit 300 may be able to complete the delivery more quickly such that delivery is optimized.

In some embodiments, mobile delivery unit 300 may be autonomous and may utilize AI (artificial intelligence) to receive orders and complete a delivery. Intelligent mobile delivery unit 300 may navigate to a product area 50 and coexist with both consumers and other mobile delivery unit 300, where the other mobile delivery unit 300 may or not be intelligent. In some embodiments, intelligent mobile delivery unit 300 may autonomously navigate to product areas 50 and to consumers or pickup areas 400 for delivery (FIG. 1). In some embodiments, intelligent mobile delivery unit 300 may store preinstalled maps and/or may be capable of reading maps to navigate through predetermined area 5 (FIG. 1). In some embodiments, controlled (e.g., non-intelligent) mobile delivery unit 300 and intelligent mobile delivery unit 300 may support a blockchain that optimizes localized delivery in predetermined area 5. For example, data from collaborative sites (e.g., other campuses of the same company or school) may be utilized to optimize local delivery.

In some embodiments, the consumer may request status updates through the mobile application. In some embodiments, web server 600 (FIG. 1) may locate or ask mobile delivery unit 300 to provide a status update between receipt of confirmations. In some embodiments, product dispenser 100 (FIG. 1) may also provide web server 600 with indications of order status. For example, once mobile delivery unit 300 is proximate to product dispenser 100, product dispenser 100 may communicate a confirmation signal to web server 600. In turn, web server 600 may provide a related notification to the consumer.

In some embodiments, mobile delivery unit 300 may have a home base for storage or recharging, or to await deployment. In some embodiments, web server 600 (FIG. 1) may deploy mobile delivery units 300, including both controlled and intelligent mobile delivery units 300. In some embodiments, deployed mobile delivery unit 300 may utilize route optimization. In some embodiments, mobile delivery unit 300 may be deployed based on efficiency. For example, a mobile delivery unit 300 that is closer to product area 50 (FIG. 1) containing a desired product 10 may be deployed over a mobile delivery unit 300 that is farther. Alternatively, in some embodiments, a mobile delivery unit 300 that is charged may be deployed over a mobile delivery unit 300 that cannot complete a delivery because of power issues. In some embodiments, a mobile delivery unit 300 may be discharged based on their capabilities, e.g., capabilities related to traversing steps or outdoor terrain, which may include rocks or grass and may be subject to rain or snow. In some embodiments, a consumer may specify a type of mobile delivery unit 300 or behavior of mobile delivery unit 300 required for a particular delivery. For example, a consumer in a meeting may require mobile delivery unit 300 to be discrete, e.g., smaller, or to be quieter when operating. In some embodiments, a mobile delivery unit 300 is deployed for a set time period. Thus, once a mobile delivery unit 300 communicates a confirmation signal to web server 600 indicating that a delivery is completed, web server 600 may communicate an instruction to complete a subsequent delivery.

In some embodiments, mobile delivery unit 300 may autonomously or be controlled to interact with product areas 50 (FIG. 1) in coordination with other mobile delivery units 300 and consumers. For example, web server 600 may receive information from a product dispenser 100 that there is a line or a crowd waiting to obtain orders. In some embodiments, web server 600 may instruct mobile delivery unit 300 to wait at a particular location for the order, such as in a line or at pickup area near product dispenser 100. In some embodiments, web server 600 may inform mobile delivery unit 300 that order for their delivery is ready. Mobile delivery unit 300 may then navigate to be proximate to product dispenser 100 to grasp and retrieve product 10. In some embodiments, consumers may utilize web server 600 to know when their order is ready for retrieval if they are directly retrieving an order. In this way, web server 600 may support consumers directly and indirectly (e.g., via mobile delivery unit 300).

In some embodiments, mobile delivery unit 300 may interact with human delivery personnel. For example, a consumer may order a delivery from an external product source (e.g., a store, restaurant, or café). In some embodiments, product areas 50 may include locations in predetermined area 5 where mobile delivery unit 300 may meet human delivery personnel to retrieve deliveries (FIG. 1). These locations may be building lobbies, for example.

As shown in FIG. 5, product 10 may be loaded onto mobile delivery unit 300. For example, mobile delivery unit 300 may support product 10 in a receptacle 312, which may be a basket, a container, etc. Once a product 10 is grasped, mobile delivery unit 300 may retrieve product 10 and place it in receptacle 312 for transport. In some embodiments, product 10 may be loaded into receptacle 312. Receptacle 312 may provide controls related to product characteristics. In some embodiments, receptacle 312 may support temperature control, e.g., refrigeration, heating, or temperature selection. In this way, a product 10 requiring refrigeration does not spoil during transport, for example. In some embodiments, web server 600 (FIG. 1) may identify characteristics of product 10 once an order is placed and may deploy a compatible mobile delivery unit 300 for retrieval and delivery. For example, web server 600 may identify a perishable product 10 and may accordingly deploy a mobile delivery unit 300 that supports refrigeration.

Mobile delivery unit 300 may support multiple products 10 in receptacle 312. In some embodiments, deliveries may be bundled to increase efficiency. In some embodiments, mobile delivery unit 300 may deliver multiple products 10 for the same consumer. The consumer may order multiple products 10 that may or may not be provided by the same product dispenser 100 or located in the same product area 50 and a single mobile delivery unit 300 may complete all deliveries (FIG. 1). Alternatively, mobile delivery unit 300 may retrieve multiple products 10 for delivery to different consumers and/or pickup areas 400 (FIG. 1).

In some embodiments, the consumer may provide or specify a container for mobile delivery unit 300 to use. For example, the consumer may leave a mug in a product area 50 (e.g., a kitchen) and may instruct mobile delivery unit 300 to use that mug to retrieve a product 10. In some embodiments, the container for product 10 may be a product criteria that may be specified when placing an order for product 10 and/or during an active delivery.

In some embodiments, mobile delivery unit 300 may fulfill orders based on proximity at the time of requesting or based on where mobile delivery unit 300 will be located after a delivery. In some embodiments, mobile delivery unit 300 may utilize a relay system. For example, a mobile delivery unit 300 on one floor may hand off a delivery to a mobile delivery unit 300 that is stationed in an elevator. This mobile delivery unit 300 may hand off the delivery to another mobile delivery unit 300 stationed at the floor where the consumer is located. In some embodiments, a mobile delivery unit 300 may be designated as the delivery intermediary between different buildings in the same campus. Additionally or alternatively, mobile delivery unit 300 may conduct handoffs via pickup areas 400. In this way, some mobile delivery units 300 may act as delivery intermediaries, and mobile delivery unit 300 that retrieves the product may not be mobile delivery unit 300 that delivers the product.

Figure 6:
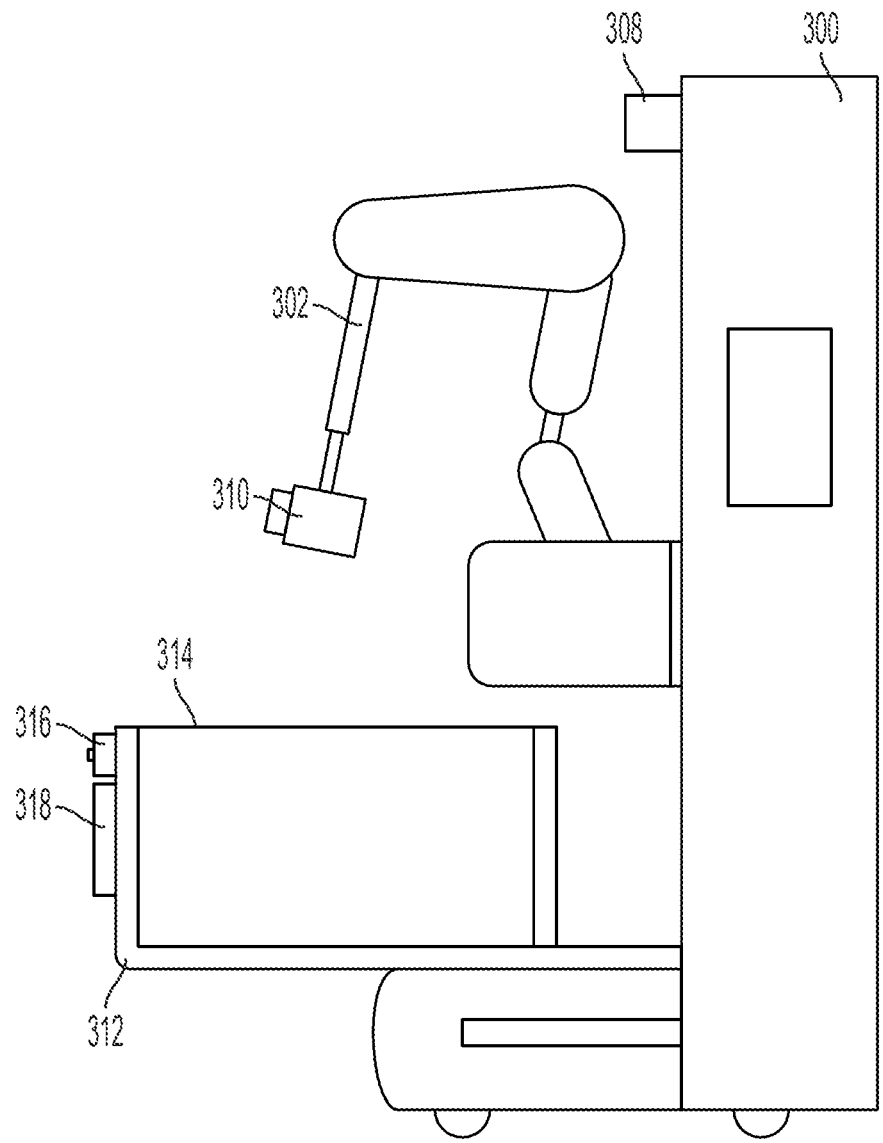
FIG. 6 shows a side view of a mobile delivery unit according to an embodiment.

As shown in FIG. 6, mobile delivery unit 300 may include a cover 314, a latch 316, and a user interface 318. Cover 314 may close receptacle 312. Closing receptacle 312 may allow products 10 to remain secure in receptacle 312 as mobile delivery unit 300 travels through predetermined area 5 (FIG. 1). In some embodiments, receptacle 312 may have security controls. In some embodiments, latch 316 may be a lock that prevent cover 314 from being removed. Accordingly, latch 316 must be unlocked to retrieve product 10 (FIG. 5) disposed in receptacle 312. In some embodiments, only the consumer receiving the delivery may be able to unlock latch 316 ad remove cover 314 to retrieve product 10. In some embodiments, the consumer may authorize another person, such as a coworker, to unlock latch 316 ad remove cover 314 to retrieve product 10 in addition to or alternative to themselves. In some embodiments, the consumer may specify recipients for product 10 when placing an order for product 10 and/or during an active delivery. Specified recipients may be delivery criteria inputted by the consumer. In this way, product 10 cannot be stolen as mobile delivery unit 300 travels through predetermined area 5.

In some embodiments, user interface 318 may present a code (e.g., a QR code) that corresponds to the active delivery. The mobile application may confirm the delivery via the code to unlock latch 316 to allow an authorized recipient to retrieve product 10 (FIG. 5). In some embodiments, unlocking latch 316 may cause a confirmation signal to be communicated to web server 600 (FIG. 1) indicating that the delivery is completed. In some embodiments, user interface 318 may present a code that may be entered on the mobile application, which may cause a confirmation signal to be communicated to web server 600 indicating that the delivery is completed. In some embodiments, user interface 318 may confirm the identity of the recipient using code verification or using facial recognition. In some embodiments, sensor 310 may be a computer vision/optical sensor that observes when a product 10 is removed from receptacle 312. Once sensor 310 determines that product 10 is removed, a confirmation signal may be communicated to web server 600 indicating that the delivery is completed. In some embodiments, sensor 310 may verify the recipient is authorized to retrieve product 10. In some embodiments, mobile delivery unit 300 may have a button that a consumer may press to confirm that the delivery was completed. Pressing the button may cause a confirmation signal to be communicated to web server 600 indicating that the delivery is completed.

Figure 7:
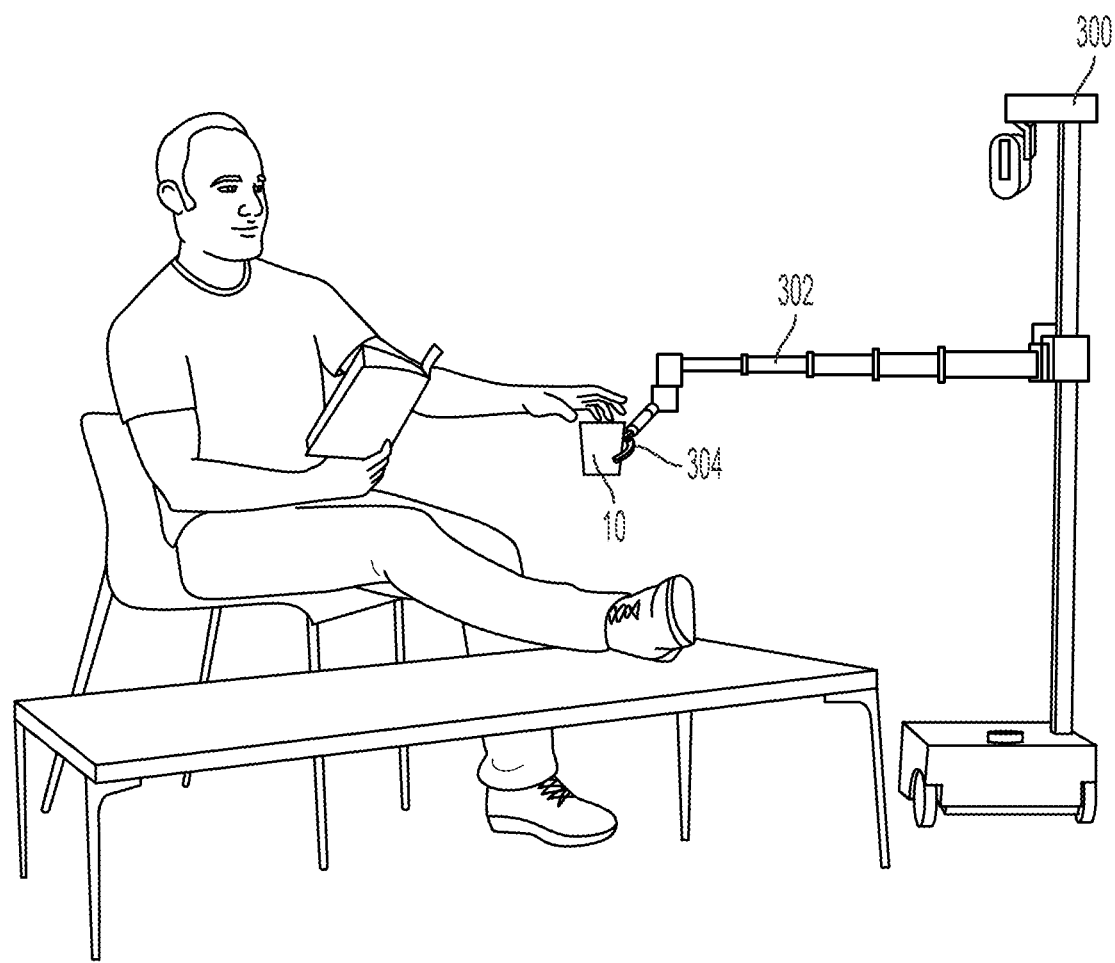
FIG. 7 shows a perspective view of a mobile delivery unit and a consumer according to an embodiment.

With reference to FIG. 7 and as discussed above, mobile delivery unit 300 may include arm 302 and gripper 304 to grasp, retrieve, and deliver products 10. In some embodiments, arm 302 may extend to deliver product 10 to the consumer. In some embodiments, gripper 304 may grasp product 10 as arm 302 is maneuvered to deliver product 10 to the consumer.

As shown, the consumer may be located in a sitting area. Accordingly, in some embodiments, mobile delivery unit 300 may navigate to the sitting area to deliver product 10. The consumer may also be located in a cubicle, an office, a conference room, a lunch room, a classroom, or any other place in predetermined area 5 (FIG. 1). In some embodiments, mobile delivery unit 300 may be able to access some or every secured location within predetermined area 5. For example, some areas may require authorized access. Mobile delivery unit 300 may enter these areas if allowed by web server 600 or an authorized user. Alternatively, mobile delivery unit 300 may be prevented from entering these areas. The mobile application may indicate to a consumer if they have selected a delivery location that a mobile delivery unit 300 may not access. In this way, the consumer may select another delivery location to receive their desired product 10.

In some embodiments, mobile delivery unit 300 may navigate to the consumer by tracking them via electronic device 700 (FIG. 1). In this way, the consumer may move around within predetermined area 5 and still receive product 10 at their location. In some embodiments, mobile delivery unit 300 may deliver product 10 to a location where the consumer is not present. The consumer may wish to receive product 10 at their desk, for example. However, they may not be at their desk when mobile delivery unit 300 arrives. Mobile delivery unit 300 may place product 10 on the consumer's desk, or a secure location at the consumer's desk and confirm delivery if the consumer provides instructions during ordering that this delivery method is sufficient.

Figure 10:
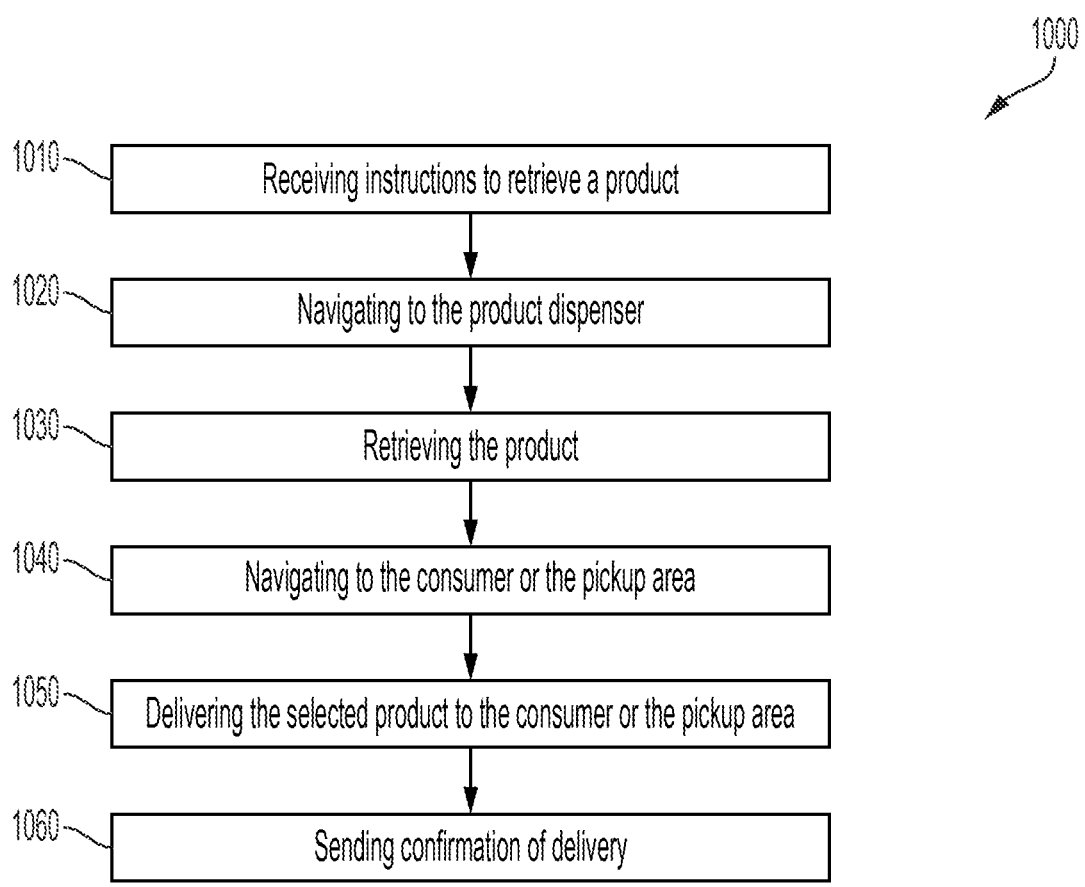
FIG. 10 shows an exemplary method of delivering a product according to an embodiment.

The consumer may select how their order is delivered. For example, the user may choose to have product 10 delivered directly to them at any location. Alternatively, the consumer may choose to pickup product 10 at a more convenient pickup location, such as pickup area 400 (FIG. 10).

Figure 8:
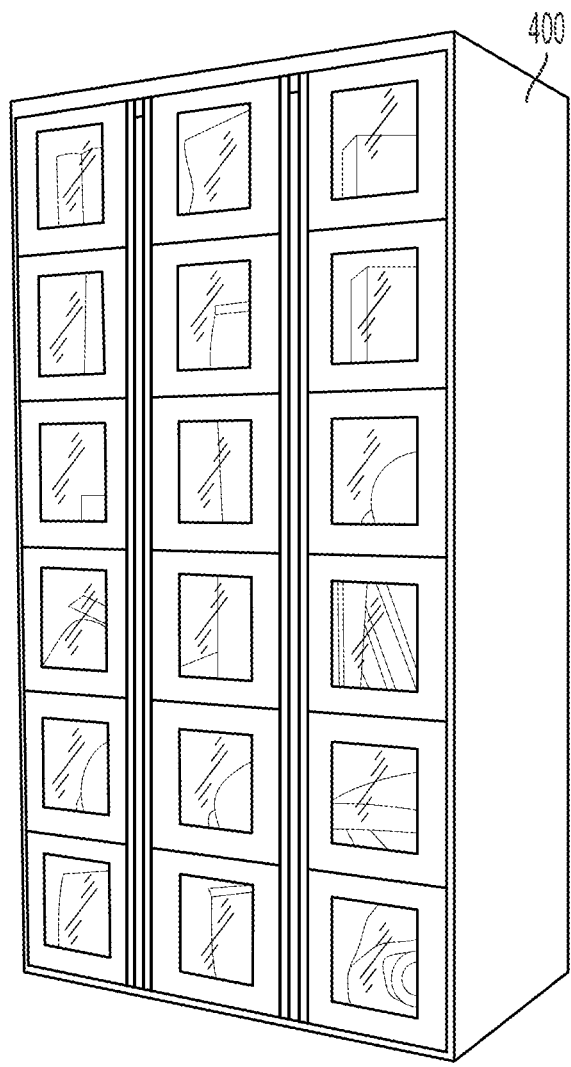
FIG. 8 shows a perspective view of a pickup area according to an embodiment.

As shown in FIG. 8, in some embodiments, pickup area 400 may be a locker. In some embodiments, pickup area 400 may be a bank of lockers. Pickup area 400 may be located in predetermined area 5 at a place that is easily accessible by the consumer or mobile delivery unit 300 (FIG. 1). For example, pickup area 400 may be in a common area, such as a cafeteria or kitchen. In some examples, pickup area 400 may be located in hallways near elevators or stairwells on each floor of a building.

In some embodiments, the consumer may specify which pickup area 400 they prefer to retrieve a product 10 from when placing an order for a product 10 and/or during an active delivery. The consumer may identify a closest or most convenient pickup area 400. Additionally, the consumer may know they will be in a specific location at a potential delivery time and may select a pickup area 400 proximate to this specific location. For example, the consumer may have a meeting scheduled on a particular floor of a building and may select to retrieve a product 10 from a pickup area 400 on that floor.

In some embodiments, mobile delivery unit 300 may deliver the order to pickup area 400 that is closest to the consumer. In some embodiments, mobile delivery unit 300 may autonomously select and navigate to a pickup area 400 for delivery. In some embodiments, web server 600 may provide instructions to mobile delivery unit 300 to delivery product 10 to a specific pickup area 400. In some embodiments, mobile delivery unit 300 may communicate a confirmation signal to web server 600 that mobile delivery unit 300 received the instructions. In some embodiments, web server 600 may provide navigation instructions to mobile delivery unit 300 for traveling to pickup area 400. In some embodiments, mobile delivery unit 300 may communicate a confirmation signal to web server 600 that mobile delivery unit 300 received the navigation instructions. In some embodiments, pickup area 400 may communicate a confirmation signal that mobile delivery unit 300 delivered product 10 to pickup area 400. In some embodiments, mobile delivery unit 300 may communicate a confirmation signal that mobile delivery unit 300 delivered product 10 to pickup area 400. Delivering product 10 to pickup area 400 may indicate that the delivery is completed. In some embodiments, web server 600 may provide a confirmation signal to electronic device 700 (FIG. 1) to inform the user that their desired product 10 is ready for pickup. In some embodiments, when placing an order, the consumer is provided with an estimated time of arrival such that the consumer may know when to go to pickup area 400 to retrieve product 10. In this way, the consumer may interact minimally with the system and methods described herein. In some embodiments, the same or different mobile delivery unit 300 may be instructed at a later time to retrieve product 10 from pickup area 400 and deliver it to the consumer at their location.

In some embodiments, mobile delivery unit 300 may deliver the order to pickup area 400 based on characteristics of product 10. For example, product 10 may be perishable such that the pickup station needs to have refrigeration. Pickup area 400 may provide insulated (with a lid) to maintain a product temperature. In some embodiments, pickup area 400 may have security controls. For example, only the consumer may be able to open pickup area 400, which may be a locker, to retrieve product 10. The consumer may designate another person to retrieve their product as well, such as a coworker. In some embodiments, the consumer may specify recipients for product 10 when placing an order for product 10 and/or during an active delivery. Specifying recipients may be delivery criteria that the consumer may input. In this way, products cannot be stolen from pickup area 400. In some embodiments, mobile delivery unit 300 may know that a product 10 contains allergens, e.g., nuts, and may place product 10 in pickup areas 400 accordingly. For example, all products 10 containing nuts may be in one pickup area 400, e.g., one locker or bank of lockers. In some embodiments, if a consumer requests direct delivery and they are unavailable, after a predetermined period of time, mobile delivery unit 300 may place the delivery at a pickup area 400.

Figure 9:
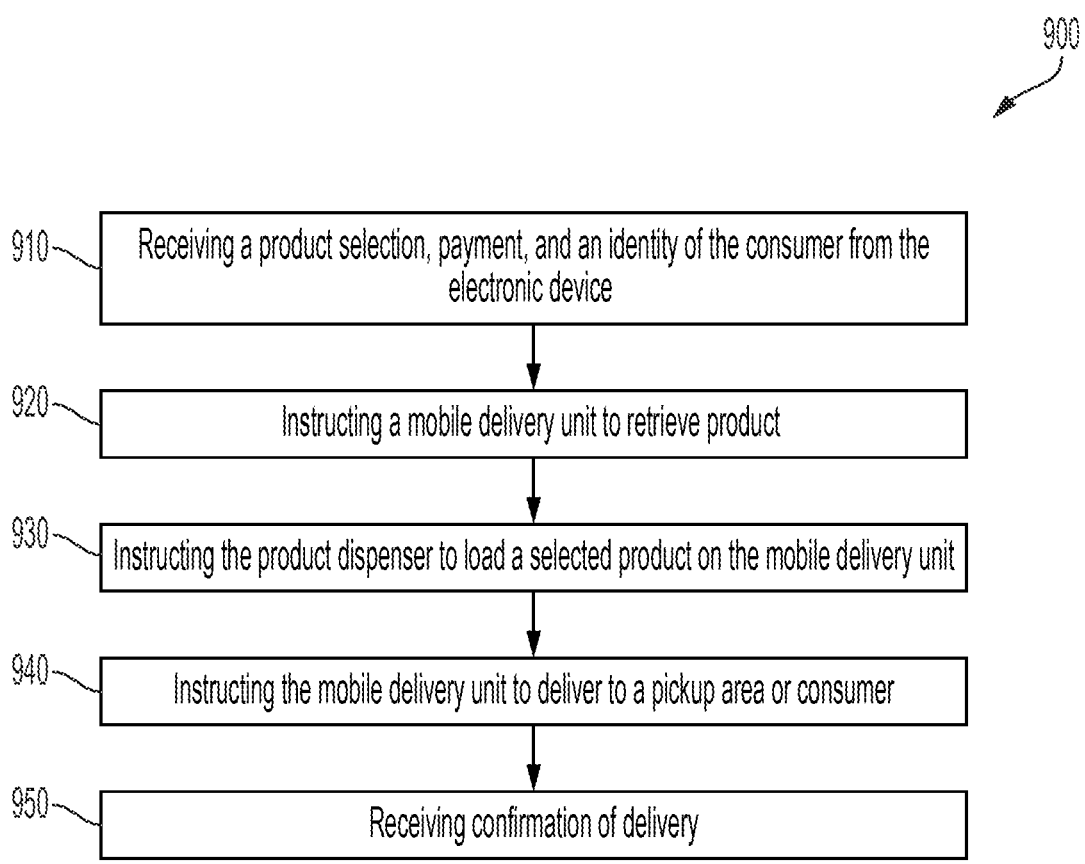
FIG. 9 shows an exemplary method of delivering a product according to an embodiment.

An exemplary method 900 of delivering a product 10 is shown in FIG. 9. In step 910, web server 600 may receive a product selection, payment, and an identity of the consumer from electronic device 700 (FIG. 1). In step 920, web server 600 may instruct a mobile delivery unit 300 (FIG. 1) to retrieve product 10. Mobile delivery unit 300 may retrieve product 10 from a product area 50, e.g., a product dispenser 100 (FIG. 1). In step 930, web server 600 may instruct product dispenser 100 to load a selected product 10 on mobile delivery unit 300. Mobile delivery unit 300 may retrieve product 10 by grasping it and inserting it into a receptacle (e.g., receptacle 312 in FIGS. 5-6). Alternatively, mobile delivery unit 300 may hold product 10 in a gripper 304 (FIG. 7). In step 940, web server 600 may instruct mobile delivery unit 300 to deliver product 10 to a pickup area 400 or to the consumer. In step 950, confirmation of delivery may be sent. Once delivered, web server 600 may receive confirmation of delivery from mobile delivery unit 300 and/or the consumer via electronic device 700 (FIG. 1). In some embodiments, a confirmation signal may be sent to confirm delivery.

An exemplary method 1000 of delivering a product 10 is shown in FIG. 10. In step 1010, mobile delivery unit 300 may receive instructions to retrieve a product 10 (FIG. 1). Instructions may be received from web server 600 (FIG. 1). Mobile delivery unit 300 may communicate a confirmation signal to web server 600 indicating receipt of the instructions. Web server 600 may communicate navigation instructions to mobile delivery unit 300. In step 1020, mobile delivery unit 300 may navigate to product dispenser 100. In step 1030, mobile delivery unit 300 may retrieve product 10. Mobile delivery unit 300 and/or product dispenser 100 may communicate a confirmation signal to web server 600 indicating retrieval of product 10. Web server 600 may communicate navigation instructions to mobile delivery unit 300. In step 1040, mobile delivery unit 300 may navigate to the consumer or pickup area 400. In step 1050, mobile delivery unit 300 may deliver the selected product to the consumer or pickup area 400. In step 1060 mobile delivery unit 300 and/or the consumer via electronic device 700 (FIG. 1) may send confirmation of delivery.

Figure 11:
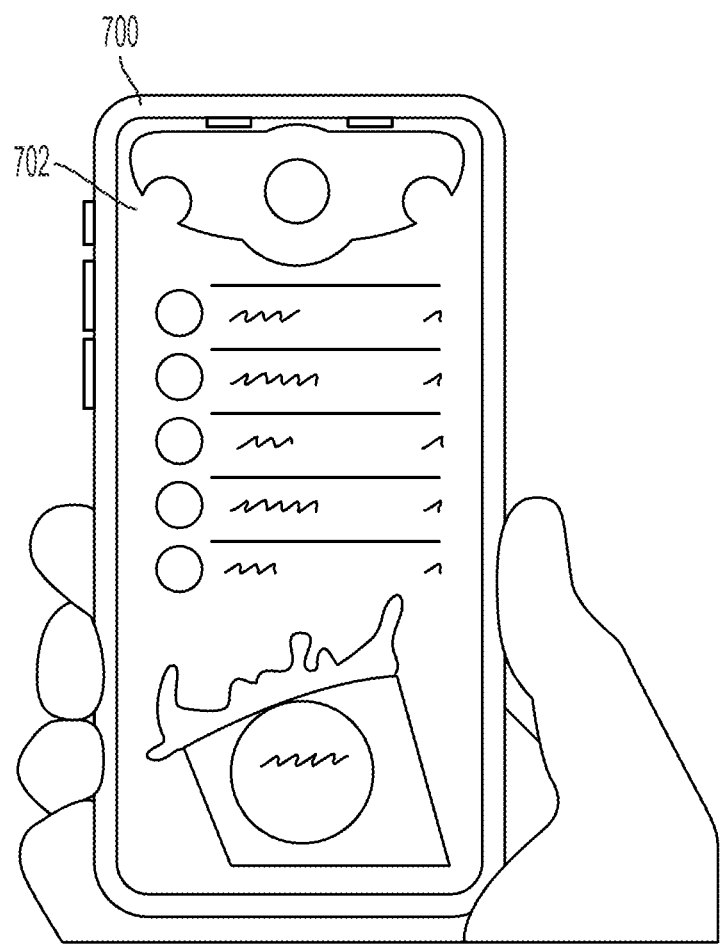
FIG. 11 shows a front view of an electronic device according to an embodiment.

Electronic device 700 may be a smartphone, as shown in FIG. 11. As discussed herein, a mobile application may facilitate ordering. The mobile application may be displayed on GUI (graphical user interface) 702. The consumer may receive a list of products 10 available in predetermined area 5 (FIG. 1) and select a desired product 10. Instead of selecting a specific product 10, the consumer may generally select a cool beverage, a hot beverage, or a carbonated beverage. The consumer may optionally provide delivery criteria. For example, the consumer may indicate a location for delivery, where the delivery is directly to them. The consumer may alternatively indicate a pickup area 400 (FIG. 1) for delivery. Additionally, the consumer may indicate a time of delivery, such as a specific time or a window of time. Further, the consumer may specify recipients for product 10. In addition to specifying delivery criteria when placing an order for product 10, the consumer may specify delivery criteria during an active delivery.

In some embodiments, the consumer may provide payment for product 10 via the mobile application. Ordering may be triggered by an order confirmation once selection and/or payment are completed. Placing an order may be the only interaction required by the consumer. In this way, the systems and methods described herein may require minimal user inputs to facilitate automated localized delivery. Along with ordering, the mobile application may provide delivery updates and tracking. For example, the consumer may track the location of an ordered product 10 based on signals communicated between web server 600, product dispenser 100, mobile delivery unit 300, and/or pickup area 400 (FIG. 1). Product 10 may travel between product area 50 mobile delivery unit 300, and/or pickup area 400. The tracking may be step by step, e.g., the consumer may see when product 10 is dispensed, when product 10 is being transported, when product 10 is arriving, and/or when product 10 is delivered to the consumer or pickup area 400. In some embodiments, the tracking may be continuous, e.g., the consumer may follow the movement of product 10 in real-time.

Figure 12:
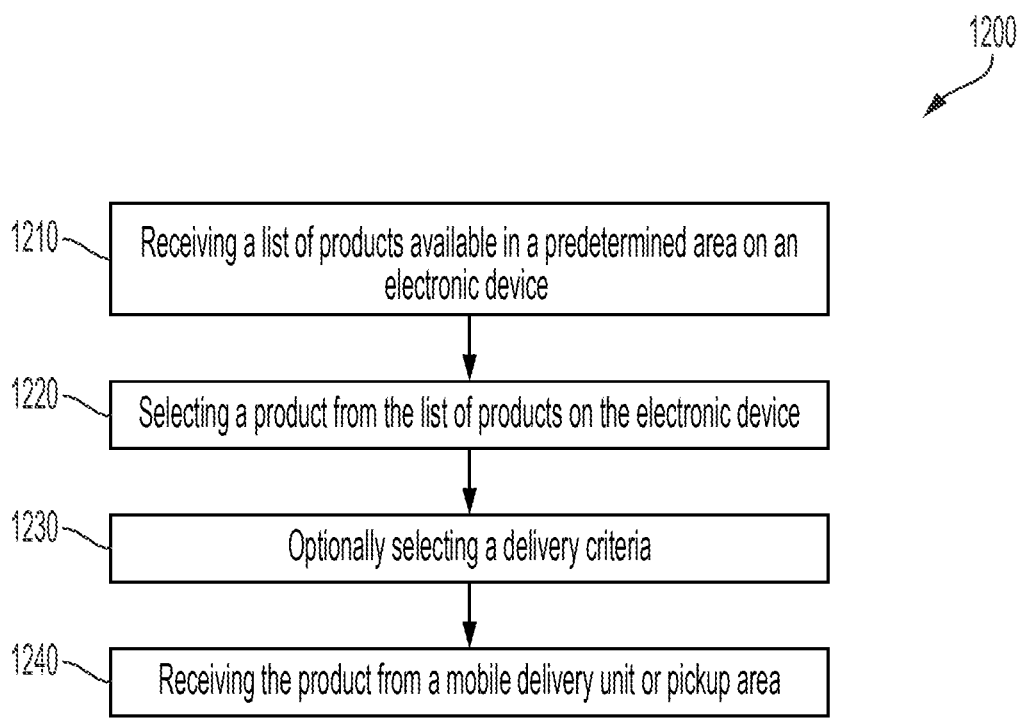
FIG. 12 shows an exemplary method of delivering a product according to an embodiment.

An exemplary method 1200 of delivering a product 10 is shown in FIG. 12. In step 1210, the consumer may receive a list of products 10 available in predetermined area 5 on an electronic device 700 (FIG. 1). In step 1220, the consumer may select a product 10 from the list of products 10 on the electronic device 700. In step 1230, the consumer optionally selects a delivery criteria. For example, the consumer may indicate a location for delivery, where the delivery is directly to them. The consumer may alternatively indicate a pickup area 400 (FIG. 1) for delivery. Additionally, the consumer may indicate a time of delivery, such as a specific time or a window of time. Further, the consumer may specify recipients for product 10. In addition to specifying delivery criteria when placing an order for product 10, the consumer may specify delivery criteria during an active delivery.

Figure 13:
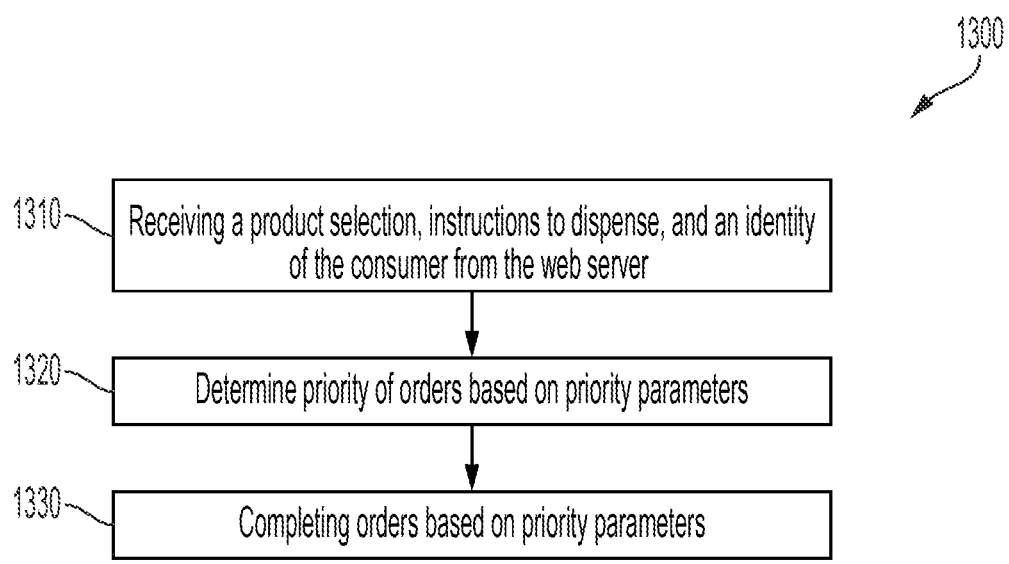
FIG. 13 shows an exemplary method of dispensing a product according to an embodiment.

An exemplary method 1300 of delivering a product 10 is shown in FIG. 13. In step 1310, mobile delivery unit 300 may receive a product 10 selection, instructions to dispense, and an identity of the consumer from web server 600. In some embodiments, product 10 is retrieved from product dispenser 100 by mobile delivery unit 300. Product dispenser 100 may be accessible by consumers as well. Accordingly, consumers and mobile delivery unit 300 may access product dispenser 100 together. The consumer may order a product as mobile delivery unit 300 is retrieving an order. In step 1320, web server 600 may determine priority of orders based on priority parameters. In some embodiments, priority parameters may include one or more delivery criteria. For example, if mobile delivery unit 300 must complete a delivery by a particular time, web server 600 may determine that mobile delivery unit 300 should receive their order before the consumer proximate to product dispenser 100. Priority parameters may include an arrival time of the consumer and mobile delivery unit 300. If the consumer reaches product dispenser 100 before mobile delivery unit 300, the consumer's order may be prioritized. Product availability may also be a priority parameter. The order for the consumer may be readily available such that their order is prioritized over the order to be retrieved by mobile delivery unit 300, which may require procurement. In step 1330, web server 600 may complete orders based on priority parameters.

Figure 14:
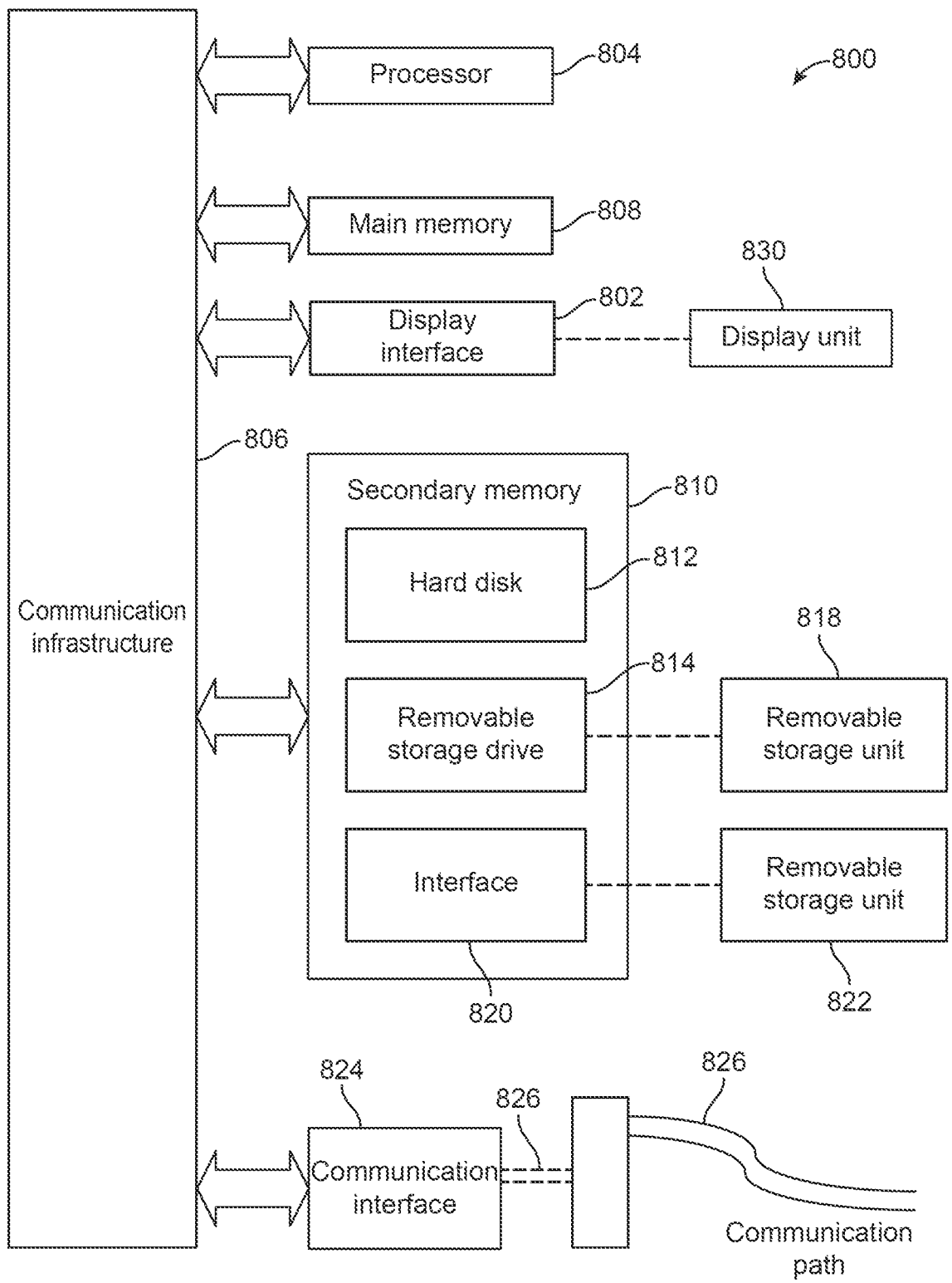
FIG. 14 shows a schematic block diagram of an exemplary computer system in which embodiments may be implemented.

FIG. 14 illustrates an exemplary computer system 800 in which embodiments, or portions thereof, may be implemented as computer-readable code. A control unit as discussed herein may be a computer system(s) having all or some of the components of computer system 800 for implementing processes discussed herein.

If programmable logic is used, such logic may execute on a commercially available processing platform or a special purpose device. One of ordinary skill in the art may appreciate that embodiments of the disclosed subject matter may be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention(s) may be implemented in terms of this example computer system 800. After reading this description, it will become apparent to a person skilled in the relevant art how to implement one or more of the invention(s) using other computer systems and/or computer architectures. Although operations may be described as a sequential process, some of the operations may in fact be performed in parallel, concurrently, and/or in a distributed environment, and with program code stored locally or remotely for access by single or multi-processor machines. In some embodiments, edge computing, cloud computing, or a combination thereof may be used. In addition, in some embodiments the order of operations may be rearranged without departing from the spirit of the disclosed subject matter.

Processor device 804 may be a special purpose or a general purpose processor device. As will be appreciated by persons skilled in the relevant art, processor device 804 may also be a single processor in a multi-core/multiprocessor system, such system operating alone, or in a cluster of computing devices operating in a cluster or server farm. Processor device 804 is connected to a communication infrastructure 806, for example, a bus, message queue, network, or multi-core message-passing scheme.

Computer system 800 also includes a main memory 808, for example, random access memory (RAM), and may also include a secondary memory 810. Secondary memory 810 may include, for example, a hard disk drive 812, or removable storage drive 814. Removable storage drive 814 may include a floppy disk drive, a magnetic tape drive, an optical disk drive, a flash memory, or the like. The removable storage drive 814 reads from and/or writes to a removable storage unit 818 in a well-known manner. Removable storage unit 818 may include a floppy disk, magnetic tape, optical disk, a universal serial bus (USB) drive, etc. which is read by and written to by removable storage drive 814. As will be appreciated by persons skilled in the relevant art, removable storage unit 818 includes a computer usable storage medium having stored therein computer software and/or data.

Computer system 800 (optionally) includes a display interface 802 (which may include input and output devices such as keyboards, mice, etc.) that forwards graphics, text, and other data from communication infrastructure 806 (or from a frame buffer not shown) for display on display unit 830.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communication interface 824. Communication interface 824 allows software and data to be transferred between computer system 800 and external devices. Communication interface 824 may include a modem, a network interface (such as an Ethernet card), a communication port, a PCMCIA slot and card, or the like. Software and data transferred via communication interface 824 may be in the form of signals, which may be electronic, electromagnetic, optical, or other signals capable of being received by communication interface 824. These signals may be provided to communication interface 824 via a communication path 826. Communication path 826 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 818, removable storage unit 822, and a hard disk installed in hard disk drive 812. Computer program medium and computer usable medium may also refer to memories, such as main memory 808 and secondary memory 810, which may be memory semiconductors (e.g. DRAMs, etc.).

Computer programs (also called computer control logic) are stored in main memory 808 and/or secondary memory 810. Computer programs may also be received via communication interface 824. Such computer programs, when executed, enable computer system 800 to implement the embodiments as discussed herein. In particular, the computer programs, when executed, enable processor device 804 to implement the processes of the embodiments discussed here. Accordingly, such computer programs represent controllers of the computer system 800. Where the embodiments are implemented using software, the software may be stored in a computer program product and loaded into computer system 800 using removable storage drive 814, interface 820, and hard disk drive 812, or communication interface 824.

Embodiments of the invention(s) also may be directed to computer program products comprising software stored on any computer useable medium. Such software, when executed in one or more data processing device, causes a data processing device(s) to operate as described herein. Embodiments of the invention(s) may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the following claims and their equivalents.

What is claimed is:

1. A system for automated vending and delivery of products to consumers, the system comprising:
   a mobile delivery unit configured to autonomously handle a product and comprising:
      an arm;
      a gripper attached to the arm and configured to grasp the product;
      a receptacle configured to store the product; and
      a first communication assembly;
   a product dispenser comprising a second communication assembly and configured to, in a first transaction, dispense a first product to the mobile delivery unit for subsequent delivery to a first consumer remote from the product dispenser and, in a second transaction, dispense a second product to a second consumer at the product dispenser; and
   a web server in communication with the first communication assembly and the second communication assembly and configured to instruct the product dispenser to dispense the first product to the mobile delivery unit in the first transaction;
   wherein the product dispenser comprises a sensor configured to detect when a product is positioned at a delivery area of the product dispenser, and wherein the web server is configured to instruct the mobile delivery unit to grasp the product based on feedback from the sensor.

2. The system of claim 1, wherein the web server is further configured to determine a priority of dispensing between the mobile delivery unit and the second consumer.

3. The system of claim 2, wherein the priority is based on at least one of a product order time, a product availability, and an arrival time by the mobile delivery unit and the second consumer to the product dispenser.

4. The system of claim 1, wherein the web server is configured to receive an order for the first product from an electronic device of the first consumer.

5. The system of claim 1, wherein the mobile delivery unit comprises a sensor to navigate to the product dispenser.

6. The system of claim 1, wherein the mobile delivery unit is configured to deliver the first product to a pickup area, and
wherein the pickup area is determined based on at least one of a selection by the first consumer, the proximity to the first consumer, and a temperature control capability.

7. The system of claim 1, wherein the product dispenser comprises a communication assembly configured to communicate with at least one of the web server and the mobile delivery unit.

8. The system of claim 1, wherein the product dispenser is a beverage dispenser.

9. The system of claim 1, wherein the receptacle is refrigerated.

10. The system of claim 1, wherein when the sensor detects the product is positioned at the delivery area, the web server is configured to instruct the mobile delivery unit to grasp the product after a predetermined time.

11. The system of claim 1, wherein the arm of the mobile delivery unit is adjustable at different heights.

12. The system of claim 1, wherein the mobile delivery unit has preinstalled maps in a memory device.

13. A system for automated vending and delivery of products to consumers, the system comprising:
a mobile delivery unit configured to autonomously handle a product and comprising:
an arm having a gripper configured to grasp the product;
a receptacle configured to store the product; a cover configured to close the receptacle;
a lock configured to secure the cover from being removed; and
a user interface;
a product dispenser configured to dispense the product the mobile delivery unit for subsequent delivery to a consumer remote from the product dispenser; and
a web server in communication with the product dispenser and the mobile delivery unit and configured to instruct the product dispenser to dispense the product to the mobile delivery unit and to instruct the mobile delivery unit to deliver the product to the consumer;
wherein the product dispenser comprises a sensor configured to detect when a product is positioned at a delivery area of the product dispenser, and
wherein the web server is configured to instruct the mobile delivery unit to grasp the product based on feedback from the sensor.

14. The system of claim 13, wherein the user interface is configured to receive an identity information from the consumer to unlock the lock.

15. The system of claim 13, wherein the mobile delivery unit further comprises a sensor configured to verify an identity of the consumer to unlock the lock.

16. The system of claim 13, wherein the product dispenser comprises a communication assembly configured to communicate with at least one of the web server and the mobile delivery unit.

17. The system of claim 13, wherein when the sensor detects the product is positioned at the delivery area, the web server is configured to instruct the mobile delivery unit to grasp the product after a predetermined time.

18. The system of claim 13, further comprising a second mobile delivery unit, wherein the web server is in communication with the first mobile delivery unit and the second mobile delivery unit simultaneously.

* * * * *